US010995163B2

(12) United States Patent
Lee et al.

(10) Patent No.: US 10,995,163 B2
(45) Date of Patent: May 4, 2021

(54) MODIFIED CONJUGATED DIENE-BASED POLYMER AND RUBBER COMPOSITION INCLUDING THE SAME

(71) Applicant: LG Chem, Ltd., Seoul (KR)

(72) Inventors: Ro Mi Lee, Daejeon (KR); Tae Chul Lee, Daejeon (KR); No Ma Kim, Daejeon (KR); Youk Reol Na, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/770,367

(22) PCT Filed: Jul. 11, 2019

(86) PCT No.: PCT/KR2019/008584
§ 371 (c)(1),
(2) Date: Jun. 5, 2020

(87) PCT Pub. No.: WO2020/013638
PCT Pub. Date: Jan. 16, 2020

(65) Prior Publication Data
US 2021/0009722 A1    Jan. 14, 2021

(30) Foreign Application Priority Data

Jul. 11, 2018  (KR) .................. 10-2018-0080581
Jul.  9, 2019  (KR) .................. 10-2019-0082689

(51) Int. Cl.
| | |
|---|---|
| *C08F 12/08* | (2006.01) |
| *C08F 2/06* | (2006.01) |
| *C08F 10/10* | (2006.01) |
| *C08F 10/14* | (2006.01) |
| *C08F 8/42* | (2006.01) |
| *C08L 9/06* | (2006.01) |
| *C08L 23/16* | (2006.01) |
| *C08L 23/22* | (2006.01) |
| *C08K 3/04* | (2006.01) |
| *C08K 3/36* | (2006.01) |

(52) U.S. Cl.
CPC .............. *C08F 12/08* (2013.01); *C08F 2/06* (2013.01); *C08F 8/42* (2013.01); *C08F 10/10* (2013.01); *C08F 10/14* (2013.01); *C08L 9/06* (2013.01); *C08L 23/16* (2013.01); *C08L 23/22* (2013.01); *C08K 3/04* (2013.01); *C08K 3/36* (2013.01)

(58) Field of Classification Search
CPC .... C08F 36/04; C08F 8/30; C08F 8/42; C08F 236/14; C08F 236/10; C08L 9/00; C08L 9/06; C08K 3/04; C08K 3/36; C08K 5/053
See application file for complete search history.

(56) References Cited

U.S. PATENT DOCUMENTS

| | | | |
|---|---|---|---|
| 4,397,994 A | 8/1983 | Takeuchi et al. | |
| 2005/0209413 A1 | 9/2005 | Labauze et al. | |
| 2013/0023624 A1 | 1/2013 | Sekikawa et al. | |
| 2014/0309332 A1 | 10/2014 | Kloppenburg et al. | |
| 2015/0252126 A1 | 9/2015 | Kloppenburg et al. | |
| 2016/0177011 A1* | 6/2016 | Kim ................... | C08K 3/36 |
| | | | 524/572 |
| 2018/0037674 A1 | 2/2018 | Yamada et al. | |
| 2019/0071390 A1 | 3/2019 | Lee | |
| 2019/0077887 A1 | 3/2019 | Dire et al. | |
| 2019/0153124 A1 | 5/2019 | Seo et al. | |

FOREIGN PATENT DOCUMENTS

| | | |
|---|---|---|
| CN | 102361886 A | 2/2012 |
| CN | 103958575 A | 7/2014 |
| CN | 108137742 A | 6/2018 |
| CN | 108164645 A | 6/2018 |
| JP | 2009179754 A | 8/2009 |
| JP | 2012149239 A | 8/2012 |
| JP | 2013087219 A | 5/2013 |
| JP | 2014159579 A | 9/2014 |
| JP | 2015120785 A | 7/2015 |
| JP | 2015524018 A | 8/2015 |
| JP | 2016216544 A | 12/2016 |
| KR | 20130096333 A | 8/2013 |
| KR | 20170102320 A | 9/2017 |
| KR | 20180054412 A | 5/2018 |
| KR | 20180065931 A | 6/2018 |
| KR | 20180080108 A | 7/2018 |
| WO | 2013064434 A1 | 5/2013 |
| WO | 2017060395 A1 | 4/2017 |
| WO | 2017060396 A1 | 4/2017 |

OTHER PUBLICATIONS

International Search Report from Application No. PCT/KR2019/008584 dated Oct. 18, 2019, 3 pages.
Chinese Search Report for Application No. 201980006081.7 dated Nov. 4, 2020, 2 pages.
Extended European Search Report for Application No. 19835021.7 dated Oct. 22, 2020, 7 pages.

* cited by examiner

*Primary Examiner* — Robert D Harlan
(74) *Attorney, Agent, or Firm* — Lerner, David, Littenberg, Krumholz & Mentlik, LLP

(57) ABSTRACT

A modified conjugated diene-based polymer and a rubber composition including the same are disclosed herein. In some embodiments, a modified conjugated diene-based polymer includes a 1,2-vinyl bond content of 30.0 wt % or less with respect to a total weight of the modified conjugated diene-based polymer, wherein the polymer has a glass transition temperature of −90° C. to −50° C., a mooney viscosity of 50 to 100 measured by ASTM D1646, polydispersity index (PDI) of 1.5 to 3.5, and a mooney relaxation ratio of 0.7 or less when measured at 110° C.

12 Claims, No Drawings

MODIFIED CONJUGATED DIENE-BASED POLYMER AND RUBBER COMPOSITION INCLUDING THE SAME

CROSS-REFERENCE TO RELATED APPLICATIONS

The present application is a national phase entry under 35 U.S.C. § 371 of International Application No. PCT/KR2019/008584, filed on Jul. 11, 2019, which claims priority from Korean Patent Application Nos. 10-2018-0080581, filed on Jul. 11, 2018, and 10-2019-0082689, filed on Jul. 9, 2019, the entire contents of which are incorporated by reference herein.

TECHNICAL FIELD

The present invention relates to a modified conjugated diene-based polymer which has improved rolling resistance properties and abrasion properties and excellent processability, and a rubber composition including the same.

BACKGROUND ART

According to the recent demand for cars having a low fuel consumption ratio, a conjugated diene-based polymer having modulational stability represented by wet skid resistance as well as low rolling resistance, and excellent abrasion resistance and tensile properties is required as a rubber material for tires.

In order to reduce the rolling resistance of tires, there is a method of reducing hysteresis loss of vulcanized rubber, and rebound resilience at 50° C. to 80° C., tan δ, Goodrich heating, or the like is used as an evaluation index of the vulcanized rubber. That is, it is desirable to use a rubber material having high rebound resilience at the above temperature or a low tan δ value or Goodrich heating.

Natural rubbers, polyisoprene rubbers, or polybutadiene rubbers are known as rubber materials having low hysteresis loss, but these rubbers have a limitation of low wet skid resistance. Thus, recently, conjugated diene-based polymers or copolymers such as styrene-butadiene rubbers (hereinafter, referred to as "SBR") and butadiene rubbers (hereinafter, referred to as "BR"), are prepared by emulsion polymerization or solution polymerization to be used as rubbers for tires. Among these polymerization methods, the greatest advantage of the solution polymerization in comparison to the emulsion polymerization is that the vinyl structure content and the styrene content, which specify physical properties of the rubber, may be arbitrarily adjusted and its molecular weight and physical properties may be controlled by coupling or modification. Thus, the SBR prepared by the solution polymerization is widely used as a rubber material for tires because it is easy to change a structure of the finally prepared SBR or BR, and movement of chain terminals may be reduced and a coupling force with a filler such as silica and carbon black may be increased by coupling or modification of the chain terminals.

If the solution-polymerized SBR is used as the rubber material for tires, since a glass transition temperature of the rubber is increased by increasing the vinyl content in the SBR, physical properties such as running resistance and braking force, required for tires may be controlled, and fuel consumption may be reduced by appropriately adjusting the glass transition temperature. The solution-polymerized SBR is prepared by using an anionic polymerization initiator and is being used by coupling or modifying the chain terminals of the polymer thus formed using various modifiers. For example, U.S. Pat. No. 4,397,994 discloses a method of coupling active anions of the chain terminals of a polymer obtained by polymerizing styrene-butadiene using alkyllithium which is a monofunctional initiator in a non-polar solvent, using a coupling agent such as a tin compound.

DISCLOSURE OF THE INVENTION

Technical Problem

The present invention has been devised to solve the above-mentioned problems of the conventional technique, and provides a modified conjugated diene-based polymer which is capable of improving the rolling resistance and abrasion resistance of a final tire and improving processability during mixing, by controlling the glass transition temperature, 1,2-vinyl bond content, mooney viscosity and degree of branching of a modified conjugated diene-based polymer.

Technical Solution

To solve the above-described tasks, according to an embodiment of the present invention, the present invention provides a modified conjugated diene-based polymer satisfying the following conditions of i) to v): i) a glass transition temperature: −90° C. to −50° C., ii) a mooney viscosity measured in ASTM D1646 conditions: 50 to 100, iii) a 1,2-vinyl bond content with respect to a total weight of a polymer: 30.0 wt % or less, iv) molecular weight distribution (PDI; MWD): 1.5 to 3.5, and v) a mooney relaxation ratio measured at 110° C.: 0.7 or less.

In addition, the present invention provides a rubber composition including the modified conjugated diene-based polymer and a filler.

Advantageous Effects

The modified conjugated diene-based polymer according to the present invention has the high degree of branching while satisfying glass transition temperature and the 1,2-vinyl bond content in specific ranges, and may have excellent rolling resistance and abrasion resistance as well as improved processability by having a mooney viscosity controlled to an appropriate level even with the high degree of branching.

BEST MODE FOR CARRYING OUT THE INVENTION

Hereinafter, the present invention will be described in more detail in order to assist the understanding of the present invention.

It will be understood that words or terms used in the description and claims of the present invention shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

Definition

The term "polymer" used in the present disclosure refers to a polymer compound prepared by polymerizing monomers irrespective of the same or different kinds of monomers. Likewise, the general term polymer refers to a polymer prepared by only one kind of monomer and includes commonly used terms homopolymer and copolymer.

The term "vinyl content" used in the present disclosure refers to the mass (or weight) percent of butadiene included in 1 and 2 positions in a polymer chain on the basis of a conjugated diene monomer (butadiene, etc.) moiety (on the basis of the total weight of polymerized butadiene) in the polymer.

In the present invention, the term "monovalent hydrocarbon group" may mean a monovalent atomic group obtained by bonding carbon and hydrogen, in a monovalent alkyl group, alkenyl group, alkynyl group, cycloalkyl group, cycloalkyl group including one or more unsaturated bonds, and aryl group. The minimum carbon number of a substituent represented by the monovalent hydrocarbon may be determined according to the kind of each substituent.

In the present invention, the term "divalent hydrocarbon group" may mean a divalent atomic group obtained by bonding carbon and hydrogen, in a divalent alkylene group, alkenylene group, alkynylene group, cycloalkylene group, cycloalkylene group including one or more unsaturated bonds and arylene group. The minimum carbon number of a substituent represented by the divalent hydrocarbon may be determined according to the kind of each substituent.

In the present invention, the term "alkyl group" may mean a monovalent aliphatic saturated hydrocarbon and may include both linear alkyl group such as methyl, ethyl, propyl and butyl, and branched alkyl group such as isopropyl, sec-butyl, tert-butyl and neo-pentyl.

In the present invention, the term "alkenyl group" may mean a monovalent aliphatic unsaturated hydrocarbon including one or two or more double bonds.

In the present invention, the term "alkynyl group" may mean a monovalent aliphatic unsaturated hydrocarbon including one or two or more triple bonds.

In the present invention, the term "alkylene group" may mean a divalent aliphatic saturated hydrocarbon such as methylene, ethylene, propylene and butylene.

In the present invention, the term "aryl group" may mean cyclic aromatic hydrocarbon and may include both monocyclic aromatic hydrocarbon in which one ring is formed and polycyclic aromatic hydrocarbon in which two or more rings are combined.

In the present invention, the term "heterocyclic group" is obtained by substituting carbon atoms in a cycloalkyl group or an aryl group with one or more heteroatoms and may mean both a heterocycloalkyl group and a heteroaryl group.

The terms "comprising", and "having" and the derivatives thereof in the present invention, though these terms are particularly disclosed or not, do not intended to preclude the presence of optional additional components, steps, or processes. In order to avoid any uncertainty, all compositions claimed by using the term "comprising" may include optional additional additives, auxiliaries, or compounds, including a polymer or any other materials, unless otherwise described to the contrary. In contrast, the term "consisting essentially of ~" excludes unnecessary ones for operation and precludes optional other components, steps or processes from the scope of optional continuous description. The term "consisting of ~" precludes optional components, steps or processes, which are not particularly described or illustrated.

Measurement Method and Conditions

In the present disclosure, the "glass transition temperature (Tg)" is obtained as follows: a modified conjugated diene-based polymer is considered as a specimen, and based on ISO 22768:2006, a differential scanning calorimeter (product name "DSC3200S" manufactured by MacScience Inc.) is used, helium is supplied in a rate of 50 ml/min, and a DSC curve is recorded while elevating the temperature from −100° C. in a rate of 10° C./min, and the peak top (inflection point) of the DSC differential curve is measured as the glass transition temperature.

In the present disclosure, the "1,2-vinyl bond content" is measured and analyzed using Varian VNMRS 500 MHz NMR, and the 1,2-vinyl bond content in a total polymer is calculated and measured by using 1,1,2,2-tetrachloroethane as a solvent during measuring NMR, calculating 6.0 ppm as a solvent peak, 7.2-6.9 ppm as random styrene peaks, 6.9-6.2 ppm as block styrene peaks, 5.8-5.1 ppm as 1,4-vinyl and 1,2-vinyl peaks, and 5.1-4.5 ppm as 1,2-vinyl peaks.

In the present disclosure, "weight average molecular weight (Mw)", "number average molecular weight (Mn)", and "molecular weight distribution (MWD)" are determined from a molecular weight distribution curve obtained from gel permeation chromatography (GPC) analysis. The molecular weight distribution as defined by a polydispersity index (PDIMw/Mn) is calculated from the ratio of Mw/Mn. Particularly, the GPC uses two columns of PLgel Olexis (Polymer laboratories Co.) and one column of PLgel mixed-C (Polymer Laboratories Co.) in combination, and polystyrene (PS) is used as a GPC standard material for calculating the molecular weights, and tetrahydrofuran mixed with 2 wt % of an amine compound is used as a GPC measurement solvent.

In the present disclosure, for measuring the "mooney viscosity (MV)" and "mooney relaxation ratio (—S/R)", the mooney viscosity (MV, (ML1+4, @100° C. MU) is measured using MV-2000 (ALPHA Technologies Co.) using Large Rotor at a rotor speed of 2±0.02 rpm at 100° C. In this case, a specimen used is stood at room temperature (23±3° C.) for 30 minutes or more, and 27±3 g of the specimen is collected and put in a die cavity, and then, Platen is operated for 4 minutes for measurement. After measuring the mooney viscosity, the slope value of the change of the mooney viscosity shown while releasing torque is measured, and the absolute value thereof is considered as the mooney relaxation ratio.

In the present disclosure, the "Si content" is measured using an inductively coupled plasma optical emission spectroscopy (ICP-OES; Optima 7300DV) as an ICP analysis method. If the inductively coupled plasma optical emission spectroscopy is used, measurement is performed by adding about 0.7 g of a specimen to a platinum (Pt) crucible, adding about 1 mL of concentrated sulfuric acid (98 wt %, electronic grade) thereto, heating at 300° C. for 3 hours, incinerating the specimen in an electrical furnace (Thermo Scientific, Lindberg Blue M) by the following program of steps 1 to 3:

1) step 1: initial temp 0° C., rate (temp/hr) 180° C./hr, temp (holdtime) 180° C. (1 hr), 2) step 2: initial temp 180° C., rate (temp/hr) 85° C./hr, temp (holdtime) 370° C. (2 hr), and 3) step 3: initial temp 370° C., rate (temp/hr) 47° C./hr, temp (holdtime) 510° C. (3 hr), adding 1 mL of concentrated nitric acid (48 wt %) and 20 µl of concentrated hydrofluoric acid (50 wt %) to a residue, sealing the platinum crucible and shaking for 30 minutes or more, adding 1 mL of boric acid to the specimen, storing at 0° C. for 2 hours or more, diluting in 30 ml of ultrapure water, and performing incineration.

In the present disclosure, the "N content" may be measured, for example, through an NSX analysis method, and measurement by the NSX analysis method may use a quantitative analyzer of a trace amount of nitrogen (NSX-2100H). For example, in case of using the quantitative analyzer of a trace amount of nitrogen, the quantitative analyzer of a trace amount of nitrogen (Auto sampler, Horizontal furnace, PMT & Nitrogen detector) is turned on, carrier gas flow amounts are set to 250 ml/min for Ar, 350 ml/min for $O_2$, and 300 ml/min for ozonizer, a heater is set to 800° C., and the analyzer is stood for about 3 hours for stabilization. After stabilizing the analyzer, a calibration curve of calibration curve ranges of 5 ppm, 10 ppm, 50 ppm, 100 ppm and 500 ppm is made using Nitrogen standard (AccuStandard S-22750-01-5 ml), and an area corresponding to each concentration is obtained. Then, by using the ratios of concentrations to areas, a straight line is made. After that, a ceramic boat holding 20 mg of a specimen is put in the auto sampler of the analyzer and measurement is conducted to obtain an area. By using the area of the specimen thus obtained and the calibration curve, the N content is calculated. In this case, the specimen is a modified conjugated diene-based polymer from which solvents are removed by putting the specimen in hot water heated by steam and stirring, and may be a specimen from which remaining monomers, remaining modifiers and oil are removed.

Modified Conjugated Diene-Based Polymer

The modified conjugated diene-based polymer according to the present invention is a modified conjugated diene-based polymer satisfying conditions i) to v) below, and the conditions are i) a glass transition temperature: −90° C. to −50° C., ii) a mooney viscosity measured by ASTM D1646: 50 to 100, iii) a 1,2-vinyl bond content with respect to a total weight of a polymer: 30.0 wt % or less, iv) polydispersity index (PDI): 1.5 to 3.5, and v) a mooney relaxation ratio measured at 110° C.: 0.7 or less.

According to an embodiment of the present invention, the modified conjugated diene-based polymer may include a repeating unit derived from a conjugated diene-based monomer and a functional group derived from a modifier. The repeating unit derived from a conjugated diene-based monomer may mean a repeating unit formed by a conjugated diene-based monomer during polymerization, and the functional group derived from a modifier may mean a functional group derived from a modifier, which is present at one terminal of an active polymer through the reaction or coupling between an active polymer and a modifier.

According to an embodiment of the present invention, the conjugated diene-based monomer may be one or more selected from the group consisting of 1,3-butadiene, 2,3-dimethyl-1,3-butadiene, piperylene, 3-butyl-1,3-octadiene, isoprene, 2-phenyl-1,3-butadiene and 2-halo-1,3-butadiene (halo means a halogen atom).

Meanwhile, the modified conjugated diene-based polymer is a copolymer including a repeating unit derived from an aromatic vinyl monomer and may include 30 wt % or more, or 30 wt % to 50 wt % of the repeating unit derived from an aromatic vinyl monomer. Within this range, effects of excellent balance between rolling resistance and wet skid resistance may be achieved.

The aromatic vinyl monomer may be, for example, one or more selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl) styrene and 1-vinyl-5-hexylnaphthalene.

In another embodiment, the modified conjugated diene-based polymer may be a copolymer further including a repeating unit derived from a diene-based monomer of 1 to 10 carbon atoms together with the repeating unit derived from the conjugated diene-based monomer. The repeating unit derived from the diene-based monomer may be a repeating unit derived from a diene-based monomer which is different from the conjugated diene-based monomer, and the diene-based monomer which is different from the conjugated diene-based monomer may be, for example, 1,2-butadiene. If the modified conjugated diene-based polymer is a copolymer further including a diene-based monomer, the modified conjugated diene-based polymer may include the repeating unit derived from the diene-based monomer in an amount of greater than 0 wt % to 1 wt %, greater than 0 wt % to 0.1 wt %, greater than 0 wt % to 0.01 wt %, or greater than 0 wt % to 0.001 wt %, and within this range, effects of preventing gel formation may be achieved.

According to an embodiment of the present invention, the copolymer may be a random copolymer, and in this case, effects of excellent balance between physical properties may be achieved. The random copolymer may mean the arrangement of repeating units forming a copolymer in disorder.

The modified conjugated diene-based polymer according to an embodiment of the present invention is required to satisfy the glass transition temperature of −90° C. to −50° C., preferably, −80° C. to −50° C. The glass transition temperature may be changed dependent on the amount of an aromatic vinyl monomer which is a comonomer, but is not determined by only the amount of the comonomer and may be flexible according to polymerization method and conditions. That is, the modified conjugated diene-based polymer prepared to satisfy the above-described range has excellent affinity with a filler such as silica and carbon black during mixing, and its abrasion resistance may be improved. If the glass transition temperature is higher than −50° C., tensile properties such as abrasion resistance may be degraded, and if the glass transition temperature is lower than −90° C., processability may be deteriorated, and it is apprehended that viscoelasticity properties such as rolling resistance and wet skid resistance may be degraded. Accordingly, it is preferable that the above-described range is satisfied.

In addition, the modified conjugated diene-based polymer according to an embodiment of the present invention is required to satisfy the mooney viscosity of 50 to 100, particularly, 70 to 100, preferably, 70 to 90, if measured in conditions of ASTM D1646. A measure for evaluating processability may be diverse, but if the mooney viscosity satisfies the above-described range, processability may become significantly excellent.

Meanwhile, conventionally, in the glass transition temperature range of −90° C. to −50° C., the mooney viscosity is difficult to satisfy the above-described range, but according to the present invention, the degree of branching of the modified conjugated diene-based polymer may be improved through the control of polymerization method and conditions, and accordingly, a modified conjugated diene-based polymer satisfying the glass transition temperature, mooney viscosity and mooney relaxation ratio in the above-described ranges may be provided.

In addition, the modified conjugated diene-based polymer according to an embodiment of the present invention is required to satisfy the 1,2-vinyl bond content of 30 wt % or less with respect to the total weight of the polymer. The vinyl content may mean the wt % of not 1,4-added but 1,2-added conjugated diene-based monomer with respect to a conjugated diene-based copolymer composed of a monomer having a vinyl group and an aromatic vinyl-based monomer, and may be affected by the termination point of polymerization reaction, reaction environments at the termination point of polymerization reaction, etc., during polymerization.

Particularly, the 1,2-vinyl bond content may be 5 to 30 wt %, preferably, 5 to 15 wt %, and according to the 1,2-vinyl bond content, abrasion properties and rolling resistance properties may be affected. If the 1,2-vinyl bond content is greater than 30 wt %, the glass transition temperature may be affected and accordingly, abrasion properties may be extremely deteriorated. Thus, reaction conditions need to pay attention so that the 1,2-vinyl bond content satisfies the above-described range during preparing the modified conjugated diene-based polymer.

The modified conjugated diene-based polymer according to an embodiment of the present invention may have a number average molecular weight (Mn) of 1,000 g/mol to 2,000,000 g/mol, 10,000 g/mol to 1,000,000 g/mol, or 100,000 g/mol to 800,000 g/mol, and a weight average molecular weight (Mw) of 1,000 g/mol to 3,000,000 g/mol, 10,000 g/mol to 2,000,000 g/mol, or 100,000 g/mol to 1,500,000 g/mol, if measured by gel permeation chromatography (GPC). Within these ranges, effects of excellent rolling resistance and wet skid resistance may be achieved.

In another embodiment, the modified conjugated diene-based polymer may have molecular weight distribution as defined by a polydispersity index (PDI, Mw/Mn) of 1.5 to 3.5, preferably, 1.5 to 3.0, or 1.7 to 3.0, or 1.7 to 2.6, and within this range, effects of excellent tensile properties, viscoelasticity properties, and balance between physical properties may be achieved.

Also, the modified conjugated diene-based polymer has a unimodal shape or a bimodal shape molecular weight distribution curve by gel permeation chromatography (GPC), and the unimodal and bimodal curve shapes may be determined in view of continuous and batch type polymerization methods, and in view of modification reaction which is conducted by a modifier or a coupling agent.

The mooney relaxation ratio of the modified conjugated diene-based polymer measured at 110° C. may become indexes of the degree of branching and molecular weight of a corresponding modified conjugated diene-based copolymer. The mooney relaxation ratio of the modified conjugated diene-based polymer at 110° C. may be 0.7 or less, preferably, 0.6 or less, more preferably, 0.5 or less, most preferably, 0.45 or less. In addition, the decrease of the mooney relaxation ratio may mean the increase of the degree of branching and the molecular weight, and the lower limit thereof is not specifically limited but may preferably be 0.05 or more. The modified conjugated diene-based polymer according to the present invention may have the mooney relaxation ratio of 0.7 or less, and the effects of this embodiment may be shown.

The mooney relaxation ratio of the modified conjugated diene-based polymer measured at 110° C. may become the indexes of the degree of branching and molecular weight of the modified conjugated diene-based polymer as described above, and according to the decrease of the mooney relaxation ratio, the degree of branching and molecular weight of the modified conjugated diene-based polymer tend to increase. However, generally, the mooney relaxation ratio may be concerned with the mooney viscosity. For the modified conjugated diene-based polymer having the same degree of mooney viscosity, the mooney relaxation ratio may decrease with the increase of the branches and thus, may be used as the index of linearity for cases having equivalent mooney viscosity.

The mooney relaxation ratio of 0.7 or less may be achieved by, for example, controlling the weight average molecular weight in a mooney viscosity range of a modified conjugated diene-based polymer of 70 to 100 and the degree of branching of the polymer thus prepared, that is, by increasing the degree of branching if the weight average molecular weight decreases, and by decreasing the degree of branching if the weight average molecular weight increases, or by the number of the functional groups of a modifier, the addition amount of a modifier, or the degree progress of metalation.

The modified conjugated diene-based polymer according to an embodiment of the present invention may have the N and Si contents based on a weight of 25 ppm or more, 50 ppm or more, 70 ppm to 10,000 ppm, or 100 ppm to 5,000 ppm, respectively, and within these ranges, a rubber composition including the modified conjugated diene-based polymer has effects of showing excellent mechanical properties such as tensile properties and viscoelasticity properties. The N content and the Si content may respectively mean the amount of N atoms and the amount of Si atoms present in the modified conjugated diene-based polymer. Meanwhile, the N atom and the Si atom may be derived from a modifier.

Meanwhile, the modified conjugated diene-based polymer according to an embodiment of the present invention may have a modification ratio of 30% or more.

In addition, the modified conjugated diene-based polymer may have a modification ratio of 50% or more, and in case where the N atom content and the Si atom content are 25 ppm or more (based on a weight), the modification ratio may be 30% or more. The modification ratio does not change independently of the N atom and the Si atom contents but may change partially dependently.

However, in modification reaction, according to the degree of coupling by a modifier, the N atom and Si atom contents and the modification ratio may show partial independence, and in order to achieve a high modification ratio of 50% or more, preferably, 55% or more, or 60% or more, optimally 70% or more, the amount of the coupled polymer during modification reaction is required to decrease, and this may be controlled by the amount of the modifier injected, the amount of a polar additive, reaction time, the mixing time and mixing degree of the modifier and an active polymer, or the like.

As described above, if the modified conjugated diene-based polymer according to the present invention satisfies the above-described conditions, abrasion resistance and rolling resistance during mixing may be largely improved on account of the increase of affinity with a filler such as silica and carbon black, and with the improvement of physical properties, processability may also be improved. Further, in case of a modified conjugated diene-based polymer additionally satisfying the modification ratio conditions, wet skid resistance may also be improved together with abrasion resistance and rolling resistance, and accordingly, a modified conjugated diene-based polymer which may largely improve tensile properties and viscoelasticity properties may be provided.

The modifier according to the present invention may be a modifier for modifying the terminals of a conjugated diene-based polymer, and particularly, may be a modifier having affinity with silica. The modifier having affinity with silica may mean a modifier containing a functional group having affinity with silica in a compound used as a modifier, and the functional group having affinity with silica may mean a functional group having excellent affinity with a filler, particularly, a silica-based filler, and is capable of making interaction between the silica-based filler and the functional group derived from the modifier.

The modifier may be, for example, an alkoxysilane-based modifier, particularly, an alkoxysilane-based modifier containing one or more heteroatoms including a nitrogen atom, an oxygen atom, and a sulfur atom. If the alkoxysilane-based modifier is used, via substitution reaction between an anionic active part positioned at one terminal of an active polymer and an alkoxy group of the alkoxysilane-based modifier, the one terminal of the active polymer may be modified in a bonding state with a silyl group, and accordingly, the affinity of a functional group derived from the modifier present at the one terminal of a modified conjugated diene-based polymer with an inorganic filler may be increased, and the mechanical properties of a rubber composition including the modified conjugated diene-based polymer may be improved. Also, if the alkoxysilane-based modifier contains a nitrogen atom, additional effects of increasing physical properties due to the nitrogen atom may be anticipated in addition to the effects derived from the silyl group.

According to an embodiment of the present invention, the modifier may include a compound represented by the following Formula 1:

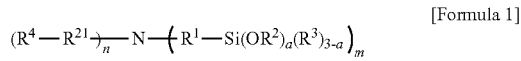

[Formula 1]

In Formula 1, $R^1$ may be a single bond, or an alkylene group of 1 to 10 carbon atoms, $R^2$ and $R^3$ may be each independently an alkyl group of 1 to 10 carbon atoms, $R^4$ may be hydrogen, an alkyl group of 1 to 10 carbon atoms, a divalent, trivalent, or tetravalent alkylsilyl group which is substituted with an alkyl group of 1 to 10 carbon atoms, or a heterocycle of 2 to 10 carbon atoms, $R^{21}$ may be a single bond, an alkylene group of 1 to 10 carbon atoms, or —[$R^{42}$O]$_j$—, where $R^{42}$ may be an alkylene group of 1 to 10 carbon atoms, a and m may be each independently an integer selected from 1 to 3, n may be an integer of 0, 1 or 2, and j may be an integer selected from 1 to 30.

In a particular embodiment, in Formula 1, $R^1$ may be a single bond, or an alkylene group of 1 to 5 carbon atoms, $R^2$ and $R^3$ may be each independently hydrogen, an alkyl group of 1 to 5 carbon atoms, $R^4$ may be hydrogen, an alkyl group of 1 to 5 carbon atoms, a tetravalent alkylsilyl group which is substituted with an alkyl group of 1 to 5 carbon atoms, or a heterocycle of 2 to 5 carbon atoms, $R^{21}$ may be a single bond, an alkylene group of 1 to 5 carbon atoms, or —[$R^{42}$O]$_j$—, where $R^{42}$ may be an alkylene group of 1 to 5 carbon atoms, a may be an integer of 2 or 3, m may be an integer selected from 1 to 3, n may be an integer of 0, 1 or 2, where m+n=3 may be satisfied, and j may be an integer selected from 1 to 10.

In Formula 1, if $R^4$ is a heterocycle, the heterocycle may be unsubstituted or substituted with a trisubstituted alkoxysilyl group, and if the heterocycle is substituted with a trisubstituted alkoxysilyl group, the trisubstituted alkoxysilyl group may be substituted via the connection with the heterocycle by an alkylene group of 1 to 10 carbon atoms, and the trisubstituted alkoxysilyl group may mean an alkoxysilyl group which is substituted with an alkoxy group of 1 to 10 carbon atoms.

In a more particular embodiment, the compound represented by Formula 1 may be one selected from the group consisting of N,N-bis(3-(dimethoxy(methyl)silyl)propyl)-methyl-1-amine, N,N-bis(3-(diethoxy(methyl)silyl)propyl)-methyl-1-amine, N,N-bis(3-(trimethoxysilyl)propyl)-methyl-1-amine, N,N-bis(3-(triethoxysilyl)propyl)-methyl-1-amine, N,N-diethyl-3-(trimethoxysilyl)propan-1-amine, N,N-diethyl-3-(triethoxysilyl)propan-1-amine, tri(trimethoxysilyl)amine, tri(3-(trimethoxysilyl)propyl)amine, N,N-bis(3-(diethoxy(methyl)silyl)propyl)-1,1,1-trimethylsilanamine, N,N-bis(3-(1H-imidazol-1-yl)propyl)-(triethoxysilyl)methan-1-amine, N-(3-(1H-1,2,4-triazole-1-yl)propyl)-3-(trimethoxysilyl)-N-(3-(trimethoxysilyl)propyl)propan-1-amine, 3-(trimethoxysilyl)-N-(3-(trimethoxysilyl)propyl)-N-(3-(1-(3-(trimehtoxysilyl)propyl)-1H-1,2,4-triazol-3-yl)propyl)propan-1-amine, N,N-bis(2-(2-methoxyethoxy)ethyl)-3-(triethoxysilyl)propna-1-amine, N,N-bis(3-(triethoxysilyl)propyl)-2,5,8,11,14-pentaoxahexadecan-16-amine, N-(2,5,8,11,14-pentaoxahexadecan-16-yl)-N-(3-(triethoxysilyl)propyl)-2,5,8,11,14-pentaoxahexadecan-16-amine and N-(3,6,9,12-tetraoxahexadecyl)-N-(3-(triethoxysilyl)propyl)-3,6,9,12-tetraoxahexadecan-1-amine.

In another embodiment, the modifier may include a compound represented by the following Formula 2:

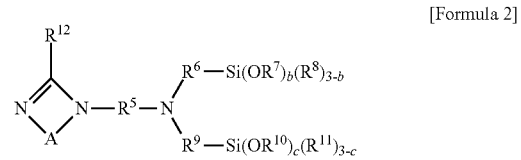

[Formula 2]

In Formula 2, $R^5$, $R^6$ and $R^9$ may be each independently an alkylene group of 1 to 10 carbon atoms, $R^7$, $R^8$, $R^{10}$ and $R^{11}$ may be each independently an alkyl group of 1 to 10 carbon atoms, $R^{12}$ may be hydrogen or an alkyl group of 1 to 10 carbon atoms, b and c may be each independently 0, 1, 2 or 3, where b+c≥1 may be satisfied, and A may be

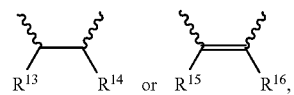

where $R^{13}$, $R^{14}$, $R^{15}$ and $R^{16}$ may be each independently hydrogen or an alkyl group of 1 to 10 carbon atoms.

In a particular embodiment, the compound represented by Formula 2 may be one selected from the group consisting of N-(3-(1H-imidazol-1-yl)propyl)-3-(triethoxysilyl)-N-(3-(triethoxysilyl)propyl)propan-1-amine and 3-(4,5-dihydro-1H-imidazol-1-yl)-N,N-bis(3-(triethoxysilyl)propyl)propan-1-amine.

In another embodiment, the modifier may include a compound represented by the following Formula 3:

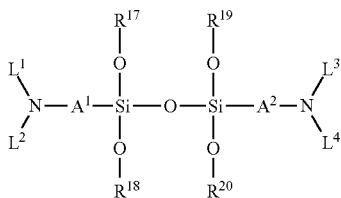

[Formula 3]

In Formula 3, $A^1$ and $A^2$ may be each independently a divalent hydrocarbon group of 1 to 20 carbon atoms, which contains an oxygen atom or not, $R^{17}$ to $R^{20}$ may be each independently a monovalent hydrocarbon group of 1 to 20 carbon atoms, $L^1$ to $L^4$ may be each independently a divalent, trivalent, or tetravalent alkylsilyl group which is substituted with an alkyl group of 1 to 10 carbon atoms, or a monovalent hydrocarbon group of 1 to 20 carbon atoms, where $L^1$ and $L^2$, and $L^3$ and $L^4$ may be combined with each other to form a ring of 1 to 5 carbon atoms, and if $L^1$ and $L^2$, and $L^3$ and $L^4$ are combined with each other to form a ring, the ring thus formed may include one to three heteroatoms selected from the group consisting of N, O and S.

In a particular embodiment, in Formula 3, $A^1$ and $A^2$ may be each independently an alkylene group of 1 to 10 carbon atoms, $R^{17}$ to $R^{20}$ may be each independently an alkyl group of 1 to 10 carbon atoms, $L^1$ to $L^4$ may be each independently a tetravalent alkylsilyl group which is substituted with an alkyl group of 1 to 5 carbon atoms, or an alkyl group of 1 to 10 carbon atoms, where $L^1$ and $L^2$, and $L^3$ and $L^4$ may be combined with each other to form a ring of 1 to 3 carbon atoms, and if $L^1$ and $L^2$, and $L^3$ and $L^4$ are combined with each other to form a ring, the ring thus formed may include one to three heteroatoms selected from the group consisting of N, O and S.

In a more particular embodiment, the compound represented by Formula 3 may be one selected from the group consisting of 3,3'-(1,1,3,3-tetramethoxydisiloxane-1,3-diyl)bis(N,N-dimethylpropan-1-amine), 3,3'-(1,1,3,3-tetraethoxydisiloxane-1,3-diyl)bis(N,N-dimethylpropan-1-amine), 3,3'-(1,1,3,3-tetrapropoxydisiloxane-1,3-diyl)bis(N,N-dimethylpropan-1-amine), 3,3'-(1,1,3,3-tetramethoxydisiloxane-1,3-diyl)bis(N,N-diethylpropan-1-amine), 3,3'-(1,1,3,3-tetramethoxydisiloxane-1,3-diyl)bis(N,N-dipropylpropan-1-amine), 3,3'-(1,1,3,3-tetraethoxydisiloxane-1,3-diyl)bis(N,N-diethylpropan-1-amine), 3,3'-(1,1,3,3-tetrapropoxydisiloxane-1,3-diyl)bis(N,N-diethylpropan-1-amine), 3,3'-(1,1,3,3-tetraethoxydisiloxane-1,3-diyl)bis(N,N-dipropylpropan-1-amine), 3,3'-(1,1,3,3-tetrapropoxydisiloxane-1,3-diyl)bis(N,N-dipropylpropan-1-amine), 3,3'-(1,1,3,3-tetramethoxydisiloxane-1,3-diyl)bis(N,N-diethylmethan-1-amine), 3,3'-(1,1,3,3-tetraethoxydisiloxane-1,3-diyl)bis(N,N-diethylmethan-1-amine), 3,3'-(1,1,3,3-tetrapropoxydisiloxane-1,3-diyl)bis(N,N-diethylmethan-1-amine), 3,3'-(1,1,3,3-tetramethoxydisiloxane-1,3-diyl)bis(N,N-dimethylmethan-1-amine), 3,3'-(1,1,3,3-tetramethoxydisiloxane-1,3-diyl)bis(N,N-dipropylmethan-1-amine), 3,3'-(1,1,3,3-tetrapropoxydisiloxane-1,3-diyl)bis(N,N-dimethylmethan-1-amine), 3,3'-(1,1,3,3-tetrapropoxydisiloxane-1,3-diyl)bis(N,N-dipropylmethan-1-amine), 3,3'-(1,1,3,3-tetraethoxydisiloxane-1,3-diyl)bis(N,N-dimethylmethan-1-amine), 3,3'-(1,1,3,3-tetraethoxydisiloxane-1,3-diyl)bis(N,N-dipropylmethan-1-amine), N,N'-((1,1,3,3-tetramethoxydisiloxane-1,3-diyl)bis(propan-3,1-diyl))bis(1,1,1-trimethyl-N-(trimethylsilyl)silanamine), N,N'-((1,1,3,3-tetraethoxydisiloxane-1,3-diyl)bis(propan-3,1-diyl))bis(1,1,1-trimethyl-N-(trimethylsilyl)silanamine), N,N'-((1,1,3,3-tetrapropoxydisiloxane-1,3-diyl)bis(propan-3,1-diyl))bis(1,1,1-trimethyl-N-(trimethylsilyl)silanamine), N,N'-((1,1,3,3-tetramethoxydisiloxane-1,3-diyl)bis(propan-3,1-diyl))bis(1,1,1-trimethyl-N-phenylsilanamine), N,N'-((1,1,3,3-tetraethoxydisiloxane-1,3-diyl)bis(propan-3,1-diyl))bis(1,1,1-trimethyl-N-phenylsilanamine), N,N'-((1,1,3,3-tetrapropoxydisiloxane-1,3-diyl)bis(propan-3,1-diyl))bis(1,1,1-trimethyl-N-phenylsilanamine), 1,3-bis(3-(1H-imidazol-1-yl)propyl)-1,1,3,3-tetramethoxydisiloxane, 1,3-bis(3-(1H-imidazol-1-yl)propyl)-1,1,3,3-tetraethoxydisiloxane, and 1,3-bis(3-(1H-imidazol-1-yl)propyl)-1,1,3,3-tetrapropoxydisiloxane.

In another embodiment, the modifier may include a compound represented by the following Formula 4:

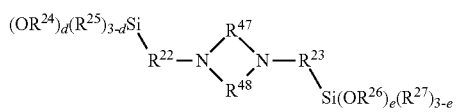

[Formula 4]

In Formula 4, $R^{22}$ and $R^{23}$ may be each independently an alkylene group of 1 to 20 carbon atoms, or $-R^{29}[OR^{29}]_f-$, $R^{24}$ to $R^{27}$ may be each independently an alkyl group of 1 to 20 carbon atoms or an aryl group of 6 to 20 carbon atoms, $R^{28}$ and $R^{29}$ may be each independently an alkylene group of 1 to 20 carbon atoms, $R^{47}$ and $R^{48}$ may be each independently a divalent hydrocarbon group of 1 to 6 carbon atoms, d and e may be each independently 0, or an integer selected from 1 to 3, where d+e may be an integer of 1 or more, and f may be an integer of 1 to 30.

Particularly, in Formula 4, $R^{22}$ and $R^{23}$ may be each independently an alkylene group of 1 to 10 carbon atoms, or $-R^{29}[OR^{29}]_f-$, $R^{24}$ to $R^{27}$ may be each independently an alkyl group of 1 to 10 carbon atoms, $R^{28}$ and $R^{29}$ may be each independently an alkylene group of 1 to 10 carbon atoms, d and e may be each independently 0, or an integer selected from 1 to 3, where d+e may be an integer of 1 or more, and f may be an integer of 1 to 30.

More particularly, the compound represented by Formula 4 may be a compound represented by the following Formula 4a, Formula 4b, or Formula 4c:

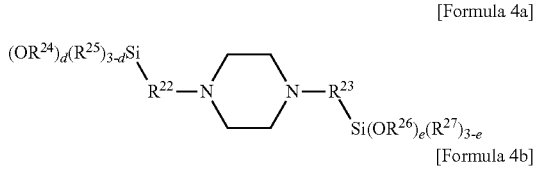

[Formula 4a]

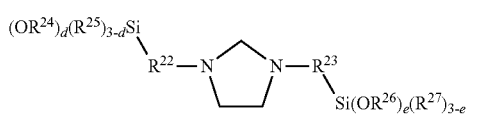

[Formula 4b]

-continued

[Formula 4c]

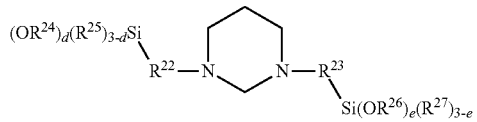

In Formula 4a, Formula 4b and Formula 4c, $R^{22}$ to $R^{27}$, d and e are the same as described above.

In a more particular embodiment, the compound represented by Formula 4 may be one selected from the group consisting of 1,4-bis(3-(3-(triethoxysilyl)propoxy)propyl)piperazine, 1,4-bis(3-(triethoxysilyl)propyl)piperazine, 1,4-bis(3-(trimethoxysilyl)propyl)piperazine, 1,4-bis(3-(dimethoxymethylsilyl)propyl)piperazine, 1-(3-(ethoxydimethlylsilyl)propyl)-4-(3-(triethoxysilyl)propyl)piperazine, 1-(3-(ethoxydimethyl)propyl)-4-(3-(triethoxysilyl)methyl)piperazine, 1-(3-(ethoxydimethyl)methyl)-4-(3-(triethoxysilyl)propyl)piperazine, 1,3-bis(3-(triethoxysilyl)propyl)imidazolidine, 1,3-bis(3-(dimethoxyethylsilyl)propyl)imidazolidine, 1,3-bis(3-(trimethoxysilyl)propyl)hexahydropyrimidine, 1,3-bis(3-(triethoxysilyl)propyl)hexahydropyrimidine and 1,3-bis(3-(tributoxysilyl)propyl)-1,2,3,4-tetrahydropyrimidine.

In another embodiment, the modifier may include a compound represented by the following Formula 5:

[Formula 5]

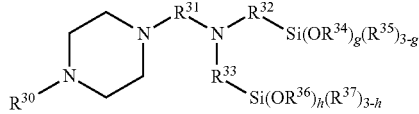

In Formula 5, $R^{30}$ may be a monovalent hydrocarbon group of 1 to 30 carbon atoms, $R^{31}$ to $R^{33}$ may be each independently an alkylene group of 1 to 10 carbon atoms, $R^{34}$ to $R^{37}$ may be each independently an alkyl group of 1 to 10 carbon atoms, and g and h may be each independently 0, or an integer selected from 1 to 3, where g+h may be an integer of 1 or more.

In another embodiment, the modifier may include a compound represented by the following Formula 6:

[Formula 6]

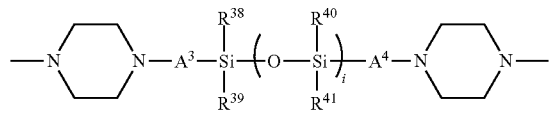

In Formula 6, $A^3$ and $A^4$ may be each independently an alkylene group of 1 to 10 carbon atoms, $R^{38}$ to $R^{41}$ may be each independently an alkyl group of 1 to 10 carbon atoms, or an alkoxy group of 1 to 10 carbon atoms, and i may be an integer selected from 1 to 30.

In another embodiment, the modifier may include one or more selected from the group consisting of 3,4-bis(2-methoxyethoxy)-N-(4-(triethoxysilyl)butyl)aniline, N,N-diethyl-3-(7-methyl-3,6,8,11-tetraoxa-7-silatridecan-7-yl)propan-1-amine, 2,4-bis(2-methoxyethoxy)-6-((trimethylsilyl)methyl)-1,3,5-triazine and 3,14-dimethoxy-3,8,8,13-tetramethyl-2,14-dioxa-7,9-dithia-3,8,13-trisilapentadecane.

In another embodiment, the modifier may include a compound represented by the following Formula 7:

[Formula 7]

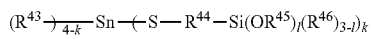

In Formula 7, $R^{43}$, $R^{45}$ and $R^{46}$ may be each independently an alkyl group of 1 to 10 carbon atoms, $R^{44}$ may be an alkylene group of 1 to 10 carbon atoms, and k may be an integer selected from 1 to 4.

In a more particular embodiment, the compound represented by Formula 7 may be one selected from the group consisting of 8,8-dibutyl-3,13-dimethoxy-3,13-dimethyl-2,14-dioxa-7,9-dithia-3,13-disila-8-stannapentadecane, 8,8-dimetyl-3,13-dimethoxy-3,13-dimethyl-2,14-dioxa-7,9-dithia-3,13-disila-8-stannapentadecane, 8,8-dibutyl-3,3,13,13-tetramethoxy-2,14-dioxa-7,9-dithia-3,13-disila-8-stannapentadecane and 8-butyl-3,3,13,13-tetramethoxy-8-((3-(trimehtoxysilyl)propyl)thio)-2,14-dioxa-7,9-dithia-3,13-disila-8-stannapentadecane.

Method of Preparing Modified Conjugated Diene-Based Polymer

In order to prepare the modified conjugated diene-based polymer, the present invention provides a method of preparing a modified conjugated diene-based polymer. The method of preparing a modified conjugated diene-based polymer may include a step of polymerizing a conjugated diene-based monomer in the presence of an organometallic compound in a hydrocarbon solvent to prepare an active polymer which is coupled with an organometal (S1); and a step of reacting the active polymer prepared in step (S1) with a modifier (S2), wherein polymerization reaction (S1) and modification reaction (S2) are performed by a continuous type or a batch type.

Hereinafter, the modified conjugated diene-based polymer thus prepared, and the characteristics of the modifier used in the reaction are overlapped with the above-description, and the explanation thereon will be omitted.

The hydrocarbon solvent is not specifically limited, but may be, for example, one or more selected from the group consisting of n-pentane, n-hexane, n-heptane, isooctane, cyclohexane, toluene, benzene and xylene.

According to an embodiment of the present invention, the organometallic compound may be used in 0.01 mmol to 10 mmol, 0.05 mmol to 5 mmol, 0.1 mmol to 2 mmol, 0.1 mmol to 1 mmol, or 0.15 to 0.8 mmol based on total 100 g of the monomer. The organometallic compound may be, for example, one or more selected from the group consisting of methyllithium, ethyllithium, propyllithium, isopropyllithium, n-butyllithium, s-butyllithium, t-butyllithium, hexyllithium, n-decyllithium, t-octyllithium, phenyllithium, 1-naphthyl lithium, n-eicosyl lithium, 4-butylphenyl lithium, 4-tolyl lithium, cyclohexyl lithium, 3,5-di-n-heptylcyclohexyl lithium, 4-cyclopentyl lithium, naphthyl sodium, naphthyl potassium, lithium alkoxide, sodium alkoxide, potassium alkoxide, lithium sulfonate, sodium sulfonate, potassium sulfonate, lithium amide, sodium amide, potassium amide, and lithium isopropylamide.

The polymerization of step (S1) may be, for example, an anionic polymerization, and particularly, a living anionic polymerization by which an anionic active part is formed at the polymerization terminal through a propagation reaction by anions. In addition, the polymerization of step (S1) may be a polymerization with heating, an isothermal polymerization, or a polymerization at a constant temperature (adiabatic polymerization). Here, the polymerization at a constant temperature means a polymerization method including a step of polymerizing using self-generated heat of reaction without optionally applying heat after adding an organometallic compound, and the polymerization with heating means a polymerization method including injecting the organometallic compound and then, increasing the temperature by optionally applying heat. The isothermal polymerization means a polymerization method by which the temperature of a polymer is kept constant by increasing heat by applying heat or taking heat after adding the organometallic compound.

In addition, according to an embodiment of the present invention, the polymerization of step (S1) may be performed by further adding a diene-based compound of 1 to 10 carbon atoms in addition to the conjugated diene-based monomer, and in this case, effect of preventing the formation of gel on the wall of a reactor during operation for a long time may be achieved. The diene-based compound may include, for example, 1,2-butadiene.

The polymerization of step (S1) may be conducted in a temperature range of 100° C. or less, 50° C. to 100° C., or 50° C. to 80° C. Within the range, the conversion ratio of the polymerization reaction may increase, the glass transition temperature, mooney viscosity and 1,2-vinyl bond content of the above-described ranges may be satisfied while controlling the molecular weight distribution of a polymer, and the improving effect of physical properties may be excellent.

The active polymer prepared by step (S1) may mean a polymer in which a polymer anion and an organometallic cation are coupled.

According to an embodiment of the present invention, the active polymer prepared by the polymerization of step (S1) may be a random copolymer, and in this case, effect of excellent balance between each of physical properties may be achieved. The random copolymer may mean the arrangement of repeating units forming a copolymer in disorder.

The term "polymerization reactant" used in the present invention may mean an intermediate of a polymer type, which is under polymerization in each reactor during performing step (S1) or may mean a polymer with a polymerization conversion ratio of less than 90% under polymerization in a reactor, after finishing step (S1) or step (S2) and prior to obtaining an active polymer or a modified conjugated diene-based polymer.

Meanwhile, the polymerization of step (S1) may be performed by including a polar additive, and the polar additive may be added in a ratio of 0.001 g to 50 g, or 0.002 g to 0.1 g based on total 100 g of the monomer. In another embodiment, the polar additive may be added in a ratio of greater than 0 g to 1 g, 0.01 g to 1 g, or 0.1 g to 0.9 g based on total 100 g of the organometallic compound. In case of injecting the polar additive in the above-described range, the glass transition temperature, mooney viscosity and 1,2-vinyl bond content in the above-described ranges may be satisfied.

The polar additive may be, for example, one or more selected from the group consisting of tetrahydrofuran, ditetrahydrofurylpropane, diethyl ether, cyclopentyl ether, dipropyl ether, ethylene methyl ether, ethylene dimethyl ether, diethyl glycol, dimethyl ether, tert-butoxy ethoxy ethane, bis(3-dimethylaminoethyl)ether, (dimethylaminoethyl) ethyl ether, trimethylamine, triethylamine, tripropylamine, and tetramethylethylenediamine, and may preferably be triethylamine, or tetramethylethylenediamine. If the polar additive is included, and if a conjugated diene-based monomer is, or a conjugated diene-based monomer and an aromatic vinyl-based monomer are copolymerized, the difference of their reaction rates may be compensated, and effect of inducing easy formation of a random copolymer may be achieved.

According to an embodiment of the present invention, in the reaction of step (S2), the modifier may be used in an amount of 0.01 mmol to 10 mmol based on total 100 g of the monomer. In another embodiment, the modifier may be used in a molar ratio of 1:0.1 to 10, 1:0.1 to 5, or 1:0.1 to 1:3, based on 1 mol of the organometallic compound in step (S1). The molar ratio of the modifier and the organometallic compound, and the injection amount of the modifier against the monomer may substantially affect the glass transition temperature, mooney viscosity and mooney relaxation ratio of the polymer thus prepared, and an appropriate ratio within the above-described range may preferably be selected and applied if possible.

In addition, according to an embodiment of the present invention, the modifier may be injected into a modification reactor, and step (S2) may be conducted in the modification reactor. In another embodiment, the modifier may be injected into a transporting part for transporting the active polymer prepared in step (S1) to a modification reactor for conducting step (S2), and the reaction may be performed by the mixing of the active polymer and the modifier in the transporting part. In this case, the reaction may be modification reaction for simply coupling the modifier with the active polymer, or coupling reaction for linking the active polymers on the basis of the modifier, and the ratio of the modification reaction and the coupling reaction is required to be controlled as described above, and this may influence the mooney viscosity and mooney relaxation ratio, and the glass transition temperature.

Meanwhile, in the preparation method according to an embodiment of the present invention, according to the kind and amount used of the organometallic compound, the kind and amount used of the polar additive, the kind and amount used of the modifier, and the temperature and time of the polymerization reaction and the modification reaction, the control of the glass transition temperature, mooney viscosity, mooney relaxation ratio and 1,2-vinyl bond content of the modified conjugated diene-based polymer thus prepared may be affected, and accordingly, the preparation method according to the present invention may be the conductance of the reaction by organically appropriately controlling so as to satisfy the conditions of the modified conjugated diene-based polymer suggested in the present invention within the above-described conditions.

According to the present invention, a rubber composition including the modified conjugated diene-based polymer is provided.

The rubber composition may include the modified conjugated diene-based polymer in an amount of 10 wt % or more, 10 wt % to 100 wt %, or 20 wt % to 90 wt %, and within this range, mechanical properties such as tensile strength and abrasion resistance are excellent, and effect of excellent balance between physical properties may be achieved.

In addition, the rubber composition may further include other rubber component, if needed, in addition to the modified conjugated diene-based polymer, and in this case, the rubber component may be included in an amount of 90 wt % or less based on the total weight of the rubber composition. In a particular embodiment, the rubber component may be included in an amount of 1 part by weight to 900 parts by weight based on 100 parts by weight of the modified conjugated diene-based copolymer.

The rubber component may be, for example, a natural rubber or a synthetic rubber, and may particularly be a natural rubber (NR) including cis-1,4-polyisoprene; a modified natural rubber which is obtained by modifying or purifying a common natural rubber, such as an epoxidized natural rubber (ENR), a deproteinized natural rubber (DPNR), and a hydrogenated natural rubber; and a synthetic rubber such as a styrene-butadiene copolymer (SBR), a polybutadiene (BR), a polyisoprene (IR), a butyl rubber (IIR), an ethylene-propylene copolymer, a polyisobutylene-co-isoprene, a neoprene, a poly(ethylene-co-propylene), a poly(styrene-co-butadiene), a poly(styrene-co-isoprene), a poly(styrene-co-isoprene-co-butadiene), a poly(isoprene-co-butadiene), a poly(ethylene-co-propylene-co-diene), a polysulfide rubber, an acryl rubber, a urethane rubber, a silicone rubber, an epichlorohydrin rubber, a butyl rubber, and a halogenated butyl rubber, and any one or a mixture two or more thereof may be used.

The rubber composition may include a filler of 0.1 parts by weight to 200 parts by weight, or 10 parts by weight to 120 parts by weight based on 100 parts by weight of the modified conjugated diene-based polymer of the present invention. The filler may be, for example, a silica-based filler, particularly, wet silica (hydrated silicate), dry silica (anhydrous silicate), calcium silicate, aluminum silicate, or colloid silica. Preferably, the filler may be wet silica which has the most significant improving effect of destruction characteristics and compatible effect of wet grip. In addition, the rubber composition may further include a carbon-based filler, if needed.

In another embodiment, if silica is used as the filler, a silane coupling agent may be used together for the improvement of reinforcing and low exothermic properties. Particular examples of the silane coupling agent may include bis(3-triethoxysilylpropyl)tetrasulfide, bis(3-triethoxysilylpropyl)trisulfide, bis(3-triethoxysilylpropyl)disulfide, bis(2-triethoxysilylethyl) tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 3-trimethoxysilylpropylbenzothiazolyltetrasulfide, 3-triethoxysilylpropylbenzolyltetrasulfide, 3-triethoxysilylpropylmethacrylatemonosulfide, 3-trimethoxysilylpropylmethacrylatemonosulfide, bis(3-diethoxymethylsilylpropyl) tetrasulfide, 3-mercaptopropyldimethoxymethylsilane, dimethoxymethylsilylpropyl-N,N-dimethylthiocarbamoyltetrasulfide, or dimethoxymethylsilylpropylbenzothiazolyltetrasulfide, and any one or a mixture of two or more thereof may be used. Preferably, bis(3-triethoxysilylpropyl) polysulfide or 3-trimethoxysilylpropylbenzothiazyltetrasulfide may be used in consideration of the improving effect of reinforcing properties.

In addition, in the rubber composition according to an embodiment of the present invention, since a modified conjugated diene-based polymer in which a functional group having high affinity with silica is brought in an active part is used as a rubber component, the mixing amount of the silane coupling agent may be smaller than a common case. Thus, the silane coupling agent may be used in an amount of 1 part by weight to 20 parts by weight, or 5 parts by weight to 15 parts by weight based on 100 parts by weight of silica. Within the above amount range, effect as a coupling agent may be sufficiently exhibited, and preventing effect of gelation of a rubber component may be achieved.

The rubber composition according to an embodiment of the present invention may be sulfur crosslinkable, and so may further include a vulcanizing agent. The vulcanizing agent may particularly be a sulfur powder and may be included in an amount of 0.1 parts by weight to 10 parts by weight based on 100 parts by weight of a rubber component. Within the above amount range, elasticity and strength required for a vulcanized rubber composition may be secured, and at the same time, an excellent low fuel consumption ratio may be achieved.

The rubber composition according to an embodiment of the present invention may further include various additives used in a common rubber industry in addition to the above components, particularly, a vulcanization accelerator, a process oil, a plasticizer, an antiaging agent, a scorch preventing agent, a zinc white, stearic acid, a thermosetting resin, or a thermoplastic resin.

The vulcanization accelerator may include, for example, thiazole-based compounds such as 2-mercaptobenzothiazole (M), dibenzothiazyldisulfide (DM), and N-cyclohexyl-2-benzothiazylsulfenamide (CZ), or guanidine-based compounds such as diphenylguanidine (DPG), in an amount of 0.1 parts by weight to 5 parts by weight based on 100 parts by weight of the rubber component.

The process oil acts as a softener in a rubber composition and may include, for example, a paraffin-based, naphthene-based, or aromatic compound. An aromatic process oil may be used in consideration of tensile strength and abrasion resistance, and a naphthene-based or paraffin-based process oil may be used in consideration of hysteresis loss and properties at a low temperature. The process oil may be included in an amount of 100 parts by weight or less based on 100 parts by weight of the rubber component. Within the above-described range, the deterioration of the tensile strength and low exothermic properties (low fuel consumption ratio) of the vulcanized rubber may be prevented.

The antiaging agent may include, for example, N-isopropyl-N'-phenyl-p-phenylenediamine, N-(1,3-dimethylbutyl)-N'-phenyl-p-phenylenediamine, 6-ethoxy-2,2,4-trimethyl-1,2-dihydroquinoline, or a condensate of diphenylamine and acetone at a high temperature, in an amount of 0.1 parts by weight to 6 parts by weight based on 100 parts by weight of the rubber component.

The rubber composition according to an embodiment of the present invention may be obtained by mulling using a mulling apparatus such as a banbury mixer, a roll, and an internal mixer according to a mixing prescription. A rubber composition having low exothermic properties and good abrasion properties may be obtained by a vulcanization process after a molding process.

Therefore, the rubber composition may be useful to the manufacture of each member of a tire such as a tire tread, an under tread, a side wall, a carcass coating rubber, a belt coating rubber, a bead filler, a chafer, and a bead coating rubber, or to the manufacture of rubber products in various industries such as a vibration-proof rubber, a belt conveyor, and a hose.

Also, the present invention provides a tire manufactured using the rubber composition.

The tire may be a tire or include a tire tread.

EXAMPLES

Hereinafter, the present invention will be explained in more detail referring to embodiments. Embodiments according to the present invention may be modified into various other types, and the scope of the present invention should not be limited to the embodiments described below. The embodiments of the present invention are provided for completely explaining the present invention to a person having an average knowledge in the art.

Example 1

To a first reactor among three continuous stirred liquid phase tank reactors (CSTR), continuously injected were n-hexane in a flow rate of 4 kg/hr, a monomer solution in which 60 wt % of a monomer mixture (80 wt % of butadiene and 20 wt % of styrene) was dissolved in n-hexane in a flow rate of 1.6 kg/h, an initiator solution in which 10 wt % of n-butyllithium was dissolved in n-hexane in a flow rate of 6 g/hr, a polar additive solution in which 10 wt % of ditetrahydrofurylpropane as a polar additive was dissolved in n-hexane in a flow rate of 0.5 g/hr, and a solution in which 15 wt % of 1,2-butadiene was dissolved in n-hexane in a flow rate of 1 g/hr. The internal temperature of the reactor was controlled to 70° C. and maintained for 40 minutes. After that, the polymer of the first reactor thus obtained was continuously supplied to the top of a second reactor, the internal temperature of the reactor was controlled to 70° C. and maintained for 60 minutes to achieve a polymerization conversion ratio of 90%. The polymer of the second reactor obtained as a result was continuously supplied to the top of a third reactor, and a solution in which 20 wt % of N,N-bis (3-(dimethoxy(methyl)silyl)propyl)-methyl-1-amine as a modifier was dissolved was continuously supplied to perform modification reaction (molar ratio of n-butyllithium: modifier=1:0.5). To the resultant product of the third reactor, a solution including 30 wt % of an antioxidant (Wingstay-K) was injected in a rate of 16 g/h to quench polymerization reaction and obtain a polymer. The polymer thus obtained was injected into hot water heated with steam and stirred to remove solvents, and then, roll dried to remove remaining solvents and water to prepare a modified conjugated diene-based polymer. Analysis results on the modified conjugated diene-based polymer thus prepared are shown in Table 1 below.

Example 2

A modified conjugated diene-based polymer was prepared by performing the same method as in Example 1 except for using tri(3-(trimethoxysilyl)propyl)amine instead of N,N-bis(3-(dimethoxy(methyl)silyl)propyl)-methyl-1-amine as a modifier in Example 1. Analysis results on the modified conjugated diene-based polymer thus prepared are shown in Table 1 below.

Example 3

A modified conjugated diene-based polymer was prepared by performing the same method as in Example 2 except for supplying a solution in which 10 wt % of tetramethylethylenediamine (TMEDA) was dissolved in n-hexane instead of ditetrahydrofurylpropane as a polar additive in a rate of 1 g/hr, and controlling the internal temperature of the first reactor to 75° C. in Example 2. Analysis results on the modified conjugated diene-based polymer thus prepared are shown in Table 1 below.

Example 4

A modified conjugated diene-based polymer was prepared by performing the same method as in Example 3 except for using N-(3-(1H-imidazol-1-yl)propyl)-3-(triethoxysilyl)-N-(3-(trimethoxysilyl)propyl)propane-1-amine instead of tri(3-(trimethoxysilyl)propyl)amine as a modifier in Example 3. Analysis results on the modified conjugated diene-based polymer thus prepared are shown in Table 1 below.

Example 5

A modified conjugated diene-based polymer was prepared by performing the same method as in Example 3 except for using 3,3'-(1,1,3,3-tetramethoxysiloxane-1,3-diyl)bis(N,N-dimethylpropane-1-amine) instead of tri(3-(trimethoxysilyl)propyl)amine as a modifier in Example 3. Analysis results on the modified conjugated diene-based polymer thus prepared are shown in Table 1 below.

Example 6

A modified conjugated diene-based polymer was prepared by performing the same method as in Example 3 except for using 1,4-bis(3-(trimethoxysilyl)propyl)piperazine instead of tri(3-(trimethoxysilyl)propyl)amine as a modifier in Example 3. Analysis results on the modified conjugated diene-based polymer thus prepared are shown in Table 1 below.

Example 7

A modified conjugated diene-based polymer was prepared by performing the same method as in Example 3 except for using 1,1,3,3-tetramethoxy-1,3-bis(3-(4-methylpiperazine-1-yl)propyl)disiloxane instead of tri(3-(trimethoxysilyl)propyl)amine as a modifier in Example 3. Analysis results on the modified conjugated diene-based polymer thus prepared are shown in Table 1 below.

Example 8

A modified conjugated diene-based polymer was prepared by performing the same method as in Example 7 except for supplying a solution in which 10 wt % of tetramethylethylenediamine (TMEDA) was dissolved in n-hexane as a polar additive in a rate of 2 g/hr in Example 7. Analysis results on the modified conjugated diene-based polymer thus prepared are shown in Table 1 below.

Comparative Example 1

A modified conjugated diene-based polymer was prepared by performing the same method as in Example 1 except for continuously injecting a solution in which 10 wt % of ditetrahydrofurylpropane was dissolved in n-hexane as a polar additive in a rate of 2 g/hr in Example 1. Analysis results on the modified conjugated diene-based polymer thus prepared are shown in Table 1 below.

Comparative Example 2

A modified conjugated diene-based polymer was prepared by performing the same method as in Example 1 except for continuously injecting an initiator solution in which 10 wt % of n-butyllithium was dissolved in n-hexane in a rate of 7.2 g/hr in Example 1. Analysis results on the modified conjugated diene-based polymer thus prepared are shown in Table 1 below.

Comparative Example 3

A modified conjugated diene-based polymer was prepared by performing the same method as in Example 1 except for continuously injecting an initiator solution in which 10 wt % of n-butyllithium was dissolved in n-hexane in a rate of 4.7 g/hr, a polar additive solution in which 10 wt % of ditetrahydrofurylpropane was dissolved in n-hexane as a polar additive in a rate of 0.4 g/hr, and a solution in which 20 wt % of N,N-diethyl-3-(trimethoxysilyl)propane-1-amine instead of N,N-bis(3-(dimethoxy(methyl)silyl)propyl)-methyl-1-amine in n-hexane as a modifier in Example 1 (molar ratio of n-butyllithium:modifier=1:0.5). Analysis results on the modified conjugated diene-based polymer thus prepared are shown in Table 1 below.

Comparative Example 4

To a 20 L autoclave reactor, 180 g of styrene, 760 g of 1,3-butadiene, 5000 g of n-hexane and 3.0 g of a tetramethylethylenediamine (TMEDA) polar additive were injected, and the internal temperature of the reactor was elevated to 70° C. If the internal temperature of the reactor reached 70° C., 0.6 g of n-butyllithium was injected as a polymerization initiator and an adiabatic reaction with heating was performed, and in this case, the internal temperature of the reactor was increased to 90° C. due to the heating of a polymer. After finishing the adiabatic reaction with heating and about 15 minutes lapse, 60 g of 1,3-butadiene was injected. After 15 minutes, N,N-diethyl-3-(trimethoxysilyl) propane-1-amine was injected as a modifier for modification reaction and reacted for 30 minutes (molar ratio of n-butyllithium:modifier=1:0.3). Then, the polymerization reaction was quenched by injecting 30 g of methanol, and 45 ml of a solution in which 0.3 wt % of butylated hydroxytoluene (BHT) antioxidant was dissolved in hexane was added thereto. The polymer thus obtained was injected into hot water heated using steam, stirred to remove solvents, and roll dried to remove remaining solvents and water to prepare a modified conjugated diene-based polymer. Analysis results on the modified conjugated diene-based polymer thus prepared are shown in Table 1 below.

EXPERIMENTAL EXAMPLE

Experimental Example 1

With respect to each of the modified or unmodified conjugated diene-based polymers prepared in the Examples and Comparative Examples, the glass transition temperature, 1,2-vinyl bond content, weight average molecular weight (Mw, ×10³ g/mol), number average molecular weight (Mn, ×10³ g/mol), molecular weight distribution (PDI, MWD), mooney viscosity (MV), mooney relaxation ratio (—S/R), and the N and S contents of a polymer were measured, respectively, and the results are shown in Table 1 below.

1) Glass Transition Temperature (Tg)

A modified conjugated diene-based polymer was considered as a specimen, and based on ISO 22768:2006, a differential scanning calorimeter (product name "DSC3200S" manufactured by MacScience Inc.) was used, helium was supplied in a rate of 50 ml/min, a DSC curve was recorded while elevating the temperature from −100° C. in a rate of 10° C./min, and the peak top (inflection point) of the DSC differential curve was measured as the glass transition temperature.

2) 1,2-Vinyl Bond Content

The vinyl content in each polymer was measured and analyzed using Varian VNMRS 500 MHz NMR.

During measuring NMR, 1,1,2,2-tetrachloroethane was used as a solvent, and the 1,2-vinyl bond content (wt %) was calculated by calculating 5.97 ppm as a solvent peak, and regarding 7.2-6.9 ppm as random styrene peaks, 6.9-6.2 ppm as block styrene peaks, 5.8-5.1 ppm as 1,4-vinyl peaks, and 5.1-4.5 ppm as 1,2-vinyl peaks.

3) Weight Average Molecular Weight (Mw), Number average molecular weight (Mn) and molecular weight distribution (MWD)

By gel permeation chromatography (GPC) analysis, a weight average molecular weight (Mw) and a number average molecular weight (Mn) were measured and molecular weight distribution as defined by a polydispersity index (PDI, Mw/Mn) was calculated. Particularly, GPC was conducted using two columns of PLgel Olexis (Polymer Laboratories Co.) and one column of PLgel mixed-C (Polymer Laboratories Co.) in combination, and polystyrene (PS) as a GPC standard material for calculating the molecular weights. A solvent for measuring GPC was prepared by mixing tetrahydrofuran with 2 wt % of an amine compound.

4) Mooney Viscosity (MV) and Mooney Relaxation Ratio (—S/R)

The mooney viscosity (MV, (ML1+4, @100° C.) MU) was measured by using MV-2000 (ALPHA Technologies Co.) using Large Rotor at a rotor speed of 2±0.02 rpm at 100° C. In this case, a specimen used was stood at room temperature (23±3° C.) for 30 minutes or more, and 27±3 g of the specimen was collected and put in a die cavity, and then, Platen was operated for 4 minutes for measurement. After measuring the mooney viscosity, the slope value of the change of the mooney viscosity shown while releasing torque was measured, and the mooney relaxation ratio was obtained.

5) N Atom and Si Atom Contents

The Si content was measured using an inductively coupled plasma optical emission spectroscopy (ICP-OES; Optima 7300DV) as an ICP analysis method. In case of using the inductively coupled plasma emission spectroscopy, measurement was performed by adding about 0.7 g of a specimen to a platinum (Pt) crucible and adding about 1 mL of concentrated sulfuric acid (98 wt %, electronic grade) thereto, heating at 300° C. for 3 hours, incinerating the specimen in an electrical furnace (Thermo Scientific, Lindberg Blue M) by the following program of steps 1 to 3:

1) step 1: initial temp 0° C., rate (temp/hr) 180° C./hr, temp (holdtime) 180° C. (1 hr)

2) step 2: initial temp 180° C., rate (temp/hr) 85° C./hr, temp (holdtime) 370° C. (2 hr)

3) step 3: initial temp 370° C., rate (temp/hr) 47° C./hr, temp (holdtime) 510° C. (3 hr), adding 1 mL of concentrated nitric acid (48 wt %) and 20 μl of concentrated hydrofluoric acid (50 wt %) to a residue, sealing the platinum crucible and shaking for 30 minutes or more, adding 1 mL of boric acid to the specimen, storing at 0° C. for 2 hours or more, diluting in 30 mL of ultrapure water, and performing incineration.

The N atom content was measured as follows. The quantitative analyzer of a trace amount of nitrogen (Auto sampler, Horizontal furnace, PMT & Nitrogen detector) was turned on, carrier gas flow amounts were set to 250 ml/min for Ar, 350 ml/min for 02, and 300 ml/min for ozonizer, a heater was set to 800° C., and the analyzer was stood for about 3 hours for stabilization. After stabilizing the analyzer, a calibration curve of calibration curve ranges of 5 ppm, 10 ppm, 50 ppm, 100 ppm and 500 ppm was made using Nitrogen standard (AccuStandard S-22750-01-5 ml), and an area corresponding to each concentration was obtained.

Then, by using the ratios of concentrations to areas, a straight line was made. After that, a ceramic boat holding 20 mg of a specimen was put in the auto sampler of the analyzer and measurement was conducted to obtain an area. By using the area of the specimen thus obtained and the calibration curve, the N content was calculated.

TABLE 1

|  | Tg (° C.) | 1,2-vinyl bond (wt %) | GPC Mw (×10³ g/mol) | Mn (×10³ g/mol) | MWD | MV | -S/R | Si (ppm) | N (ppm) |
|---|---|---|---|---|---|---|---|---|---|
| Example 1 | −71 | 10 | 512 | 320 | 1.6 | 73 | 0.65 | 132 | 52 |
| Example 2 | −71 | 10 | 764 | 332 | 2.3 | 90 | 0.41 | 101 | 62 |
| Example 3 | −72 | 9 | 715 | 325 | 2.2 | 86 | 0.43 | 105 | 67 |
| Example 4 | −71 | 10 | 714 | 340 | 2.1 | 85 | 0.45 | 150 | 120 |
| Example 5 | −71 | 10 | 536 | 315 | 1.7 | 75 | 0.68 | 78 | 95 |
| Example 6 | −71 | 10 | 739 | 336 | 2.2 | 89 | 0.44 | 75 | 90 |
| Example 7 | −71 | 10 | 585 | 325 | 1.8 | 79 | 0.70 | 75 | 170 |
| Example 8 | −63 | 20 | 580 | 322 | 1.8 | 78 | 0.70 | 74 | 168 |
| Comparative Example 1 | −42 | 41 | 531 | 296 | 1.8 | 76 | 0.63 | 102 | 56 |
| Comparative Example 2 | −70 | 11 | 368 | 205 | 1.8 | 42 | 1.20 | 160 | 135 |
| Comparative Example 3 | −72 | 9 | 959 | 480 | 2.0 | 113 | 0.35 | 45 | 20 |
| Comparative Example 4 | −71 | 10 | 562 | 312 | 1.8 | 76 | 0.72 | 72 | 30 |

Experimental Example 2

In order to comparatively analyze the physical properties of rubber compositions including the modified or unmodified copolymers prepared in the Examples and Comparative Examples, and molded articles manufactured therefrom, tensile properties, viscoelasticity properties and processability properties were measured, respectively, and the results are shown in Table 3 below.

1) Preparation of Rubber Specimen

Blending was performed using each of the modified conjugated diene-based polymers of the Examples and Comparative Examples as a raw material rubber under the mixing conditions shown in Table 2 below. The raw materials in Table 2 are represented by parts by weight based on 100 parts by weight of the raw material rubber.

TABLE 2

| Division | Raw material | Amount (parts by weight) |
|---|---|---|
| First stage mulling | Rubber | 100 |
|  | Silica | 70 |
|  | Coupling agent (X50S) | 11.2 |
|  | Process oil | 37.5 |
|  | Zinc white | 3 |
|  | Stearic acid | 2 |
|  | Antioxidant | 2 |
|  | Antiaging agent | 2 |
|  | Wax | 1 |
| Second stage mulling | Sulfur | 1.5 |
|  | Rubber accelerator | 1.75 |
|  | Vulcanization accelerator | 2 |

Particularly, the rubber specimen was mulled via a first stage mulling and a second stage mulling. In the first stage mulling, a raw material rubber, silica (filler), an organic silane coupling agent (X50S, Evonik), a process oil (TADE oil), zinc oxide (ZnO), stearic acid, an antioxidant (TMQ (RD)) (2,2,4-trimethyl-1,2-dihydroquinoline polymer), an antiaging agent (6PPD (((dimethylbutyl)-N-phenyl-phenylenediamine) and wax (Microcrystaline Wax) were mulled using a banbury mixer equipped with a temperature controlling apparatus. In this case, the initial temperature of a mulling apparatus was controlled to 70° C., and after finishing mixing, a first compound mixture was obtained at a discharge temperature of 145° C. to 155° C. In the second stage mulling, the first compound mixture was cooled to room temperature, and the first compound mixture, sulfur, a rubber accelerator (DPG (diphenylguanidine)), and a vulcanization accelerator (CZ (N-cyclohexyl-2-benzothiazylsulfenamide)) were added to the mulling apparatus and mixed at a temperature of 100° C. or less to obtain a second compound mixture. Then, via a curing process at 160° C. for 20 minutes, a rubber specimen was formed.

2) Tensile Properties

The tensile properties were measured by manufacturing each specimen and measuring tensile strength when broken and tensile stress when stretched by 300% (300% modulus) of each specimen according to an ASTM 412 tensile test method. Particularly, tensile properties were measured using a Universal Test Machin 4204 tensile tester (Instron Co.) in a rate of 50 cm/min at room temperature.

3) Viscoelasticity Properties

The viscoelasticity properties were checked by measuring viscoelasticity behavior on thermodynamic deformation at each measurement temperature (−60° C.-60° C.) with a frequency of 10 Hz by using a dynamic mechanical analyzer (GABO Co.) in a film tension mode and securing a tan δ value by using a dynamic mechanical analyzer (GABO Co.). In this case, if the tan δ value at a low temperature of 0° C. increases, wet skid resistance becomes better, and if the tan δ value at a high temperature of 60° C. increases, hysteresis loss decreases, and low running resistance (fuel consumption ratio) becomes better. The resultant values in Table 3 were indexed based on the resultant measurement value of Comparative Example 1, and thus, the higher numerical value means better results.

4) Processability Properties

By measuring the mooney viscosity (MV, (ML 1+4, @100° C.) MU) of the secondary mixture compound obtained during above 1) preparation of rubber specimen, the processability properties of each polymer was comparatively analyzed, and in this case, the lower the measured value of the moony viscosity is, the better the processability properties are.

Particularly, by using MV-2000 (ALPHA Technologies Co.) using Large Rotor at a rotor speed of 2±0.02 rpm at 100° C., each secondary mixture compound was stood at room temperature (23±3° C.) for 30 minutes or more, and 27±3 g was collected and put in a die cavity, and then, Platen was operated for 4 minutes for measurement.

5) Abrasion Resistance (DIN Abrasion Test)

With respect to each rubber specimen, DIN abrasion test was performed based on ASTM D5963 and shown by DIN wt loss index (loss volume index: abrasion resistance index (ARIA, Method A)). The higher numerical value means better results.

TABLE 3

| Division | Tensile properties | | Visco-elasticity | Abrasion resistance DIN | Processability properties |
|---|---|---|---|---|---|
| | Tensile strength (kgf/cm²) | 300% modulus (kgf/cm²) | properties tan δ (at 60° C.) | | |
| Example 1 | 200 | 86 | 129 | 125 | 65 |
| Example 2 | 216 | 80 | 127 | 131 | 70 |
| Example 3 | 212 | 78 | 125 | 132 | 70 |
| Example 4 | 187 | 80 | 130 | 129 | 69 |
| Example 5 | 217 | 81 | 119 | 126 | 65 |
| Example 6 | 203 | 75 | 127 | 127 | 68 |
| Example 7 | 205 | 81 | 132 | 135 | 69 |
| Example 8 | 208 | 82 | 115 | 128 | 66 |
| Comparative Example 1 | 199 | 91 | 100 | 100 | 75 |
| Comparative Example 2 | 150 | 82 | 121 | 106 | 52 |
| Comparative Example 3 | 215 | 75 | 114 | 125 | 92 |
| Comparative Example 4 | 185 | 92 | 112 | 110 | 85 |

As shown in Table 3, it was found that Examples 1 to Example 8 according to embodiments of the present invention showed that all tensile properties, viscoelasticity properties, abrasion resistance and processability were improved when compared with Comparative Examples 1 to 4.

In this regard, when compared with Examples 1 to 8, Comparative Example 1 showed significantly decreased viscoelasticity properties, abrasion resistance and processability, Comparative Example 2 showed significantly decreased tensile strength and abrasion resistance, Comparative Example 3 showed significantly decreased processability, and Comparative Example 4 showed significantly decreased abrasion resistance and processability. In this case, the glass transition temperature and 1,2-vinyl bond content of the polymer of Comparative Example 1 were deviated from the ranges suggested in the present invention, the mooney viscosity and mooney relaxation ratio of Comparative Example 2 and Comparative Example 3 and the mooney relaxation ratio of Comparative Example 4 were deviated from the ranges suggested in the present invention.

The results mean that the modified conjugated diene-based polymer of the present invention has the glass transition temperature and 1,2-vinyl bond content, which are controlled in specific ranges, and at the same time, the mooney viscosity and mooney relaxation ration, with are controlled in specific ranges, and thus, may show excellent tensile properties, viscoelasticity properties and abrasion resistance and at the same time, markedly improved effects of processability.

The invention claimed is:

1. A modified conjugated diene-based polymer satisfying the following conditions of i) to v):
   i) a glass transition temperature: −90° C. to −50° C.,
   ii) a mooney viscosity measured in ASTM D1646 conditions: 50 to 100,
   iii) a 1,2-vinyl bond content with respect to a total weight of a polymer: 30.0 wt % or less,
   iv) a polydispersity index (PDI): 1.5 to 3.5, and
   v) a mooney relaxation ratio measured at 110° C.: 0.7 or less.

2. The modified conjugated diene-based polymer of claim 1, wherein the glass transition temperature is −80° C. to −50° C.

3. The modified conjugated diene-based polymer of claim 1, wherein the mooney viscosity measured in ASTM D1646 conditions is 70 to 100.

4. The modified conjugated diene-based polymer of claim 1, wherein the 1,2-vinyl bond content is 5 wt % to 30 wt %.

5. The modified conjugated diene-based polymer of claim 1, wherein the polydispersity index is 1.7 to 2.6.

6. The modified conjugated diene-based polymer of claim 1, wherein the mooney relaxation ratio measured at 110° C. is 0.45 or less.

7. The modified conjugated diene-based polymer of claim 1, wherein the modified conjugated diene-based polymer has a number average molecular weight (Mn) of 1,000 g/mol to 2,000,000 g/mol, and a weight average molecular weight (Mw) of 1,000 g/mol to 3,000,000 g/mol.

8. The modified conjugated diene-based polymer of claim 1, wherein the modified conjugated diene-based polymer has a nitrogen (N) atom, and a nitrogen atom (N) content is 50 ppm or more with respect to a total weight of the polymer.

9. The modified conjugated diene-based polymer of claim 1, wherein the modified conjugated diene-based polymer has a silicon (Si) atom, and a silicon (Si) atom content is 50 ppm or more with respect to a total weight of the polymer.

10. A rubber composition, comprising:
    the modified conjugated diene-based polymer of claim 1; and
    a filler.

11. The rubber composition of claim 10, wherein the rubber composition comprises 0.1 parts by weight to 200 parts by weight of the filler with respect to 100 parts by weight of the modified conjugated diene-based polymer.

12. The rubber composition of claim 10, wherein the filler is a silica-based filler or a carbon black-based filler.

* * * * *